May 24, 1927.

P. U. DANIEL

AMUSEMENT DEVICE

Filed April 29, 1924

1,629,570

INVENTOR
Paul U. Daniel
BY
Ward Crosby & Smith
his ATTORNEYS

Patented May 24, 1927.

1,629,570

UNITED STATES PATENT OFFICE.

PAUL U. DANIEL, OF BROOKLAWN, NEW JERSEY, ASSIGNOR OF ONE-HALF TO FRANCIS C. ROGERS, OF PHILADELPHIA, PENNSYLVANIA; MINA DANIEL ADMINISTRATRIX OF SAID PAUL U. DANIEL, DECEASED.

AMUSEMENT DEVICE.

Application filed April 29, 1924. Serial No. 709,754.

This invention relates to amusement devices, and more particularly to games of skill.

More particularly the invention relates to amusement devices where a plurality of contenders compete, each to attain a given result in the least time, and the successful operation of which requires skill. The invention comprises a plurality of fanciful objects; such, for example, as miniature airplanes, mounted free to rotate in substantially a vertical plane, and a control associated with each object whereby by moving the control in proper synchronism and at the proper speed the object associated therewith may be made to rotate or loop.

One object of this invention is to provide a simple, durable and effective game of skill.

Another object is to provide such a device free from the usual governors and clutch mechanisms which usually accompany such games.

Another object is to provide a means for indicating the relative and directional rotation of the individual objects.

Further objects will more fully appear from the following description taken in connection with the accompanying drawings illustrating the preferred embodiment of the invention.

Referring to the drawings illustrating, by way of example, the preferred embodiment of the invention:

Figure 1:
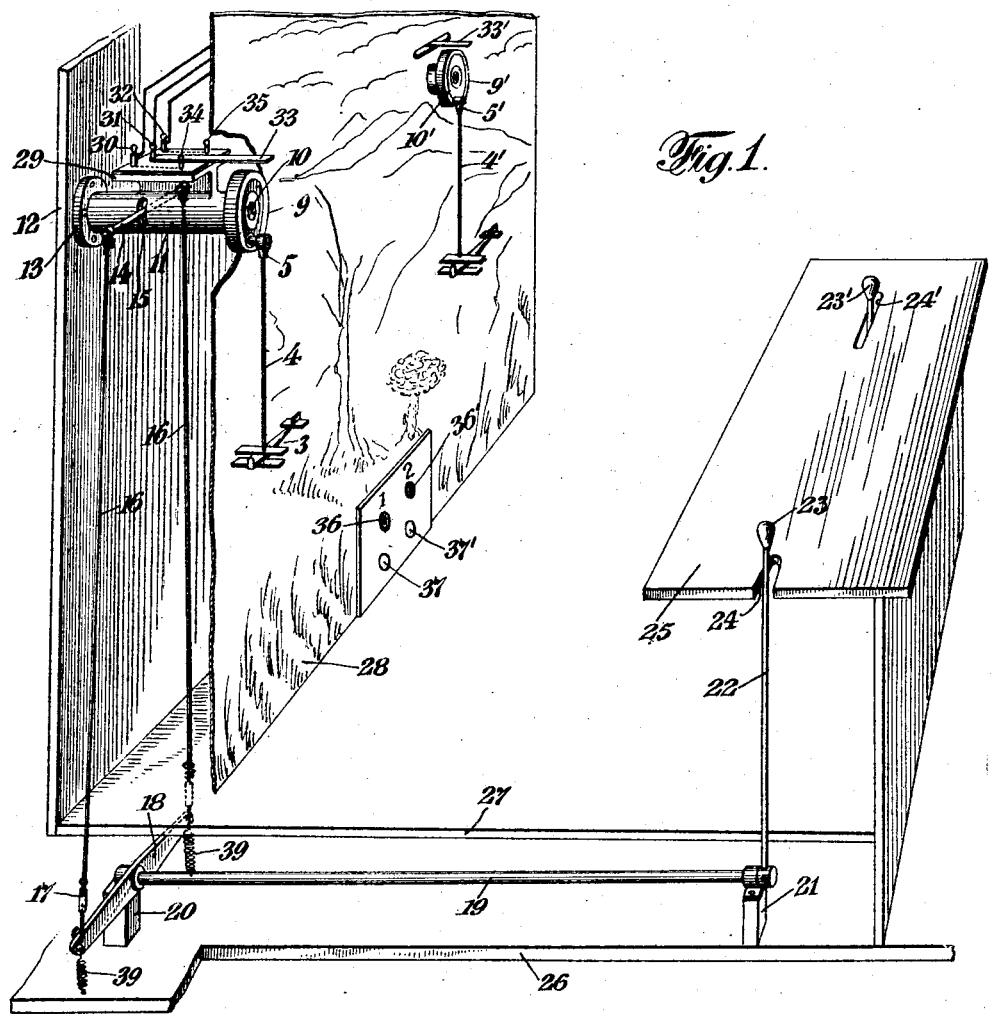
Fig. 1 is a perspective view of such an amusement device, with parts broken away to show the details of construction.

Referring to the drawings wherein similar numerals denote like parts in the various views: Two units, 1 and 2, are shown in the drawings, but it is to be understood that this is by way of illustration only, as any number can be used; usually about ten units are employed in one set-up. For the sake of clarity one unit will be described first, in detail. A fanciful object, such as a miniature airplane 3, is supported by a rod 4 which is screw-threaded into a bearing member 5 and locked in position by a lock nut 6. This bearing is supported on a crank pin 7, and is held in proper position thereon by means of the threaded end of rod 4 engaging an annular slot 8 formed in the pin 7. This means of attachment provides a simple and efficient connection and allows the bearing to rotate about the crank pin 7. The crank pin 7 is screw threaded into a disc 9 carried on the end of a shaft 10 supported in a hanger or bearing 11 which is attached to the wall or support 12 by means of a flange 13 and associated lag screw or bolts.

Attached to the shaft 10 and projecting tranversely therefrom is a cross bar or rocking arm 14 which extends through slots 15 in each side of the supporting bearing 11. These slots allow only a limited movement of the arm 14 and attached shaft 10; and in conjunction with the arm 14 constitute a limit stop for the movement of the shaft 10 in a rotary direction, thereby limiting the movement to an oscillatory motion as well as preventing the movement of the shaft 10 axially with respect to the bearing 11. A cable 16 is attached to each end of the arm 14 and at their lower ends are attached, through turnbuckles 17, to the ends of a cross bar, or rocking arm, 18 which is attached to an oscillatable shaft 19 supported by suitable bearings such as 20 and 21. A control lever 22 provided with a handle 23 is attached at the other end of shaft 19 and extends upwardly and through a slot 24 in a counter 25. Suitable flooring such as 26 and 27 and a covering wall such as 28 may be provided for suitably covering up the working parts of the device.

Indicating means.

Figures 2, 3:
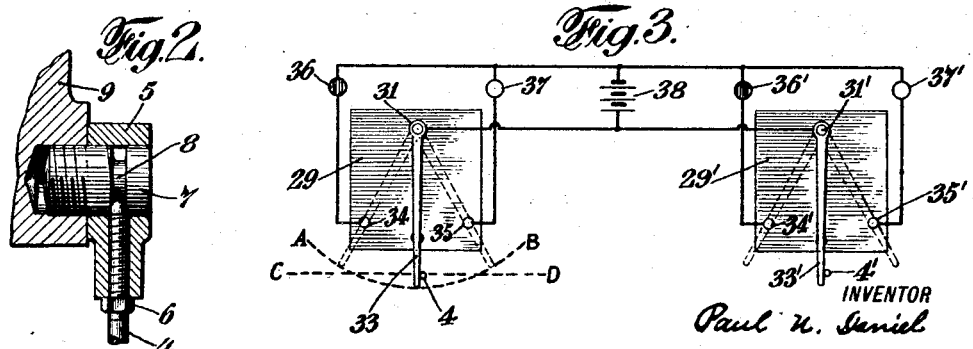
Fig. 2 shows a detail of the crank pin supporting the airplane.
Fig. 3 is a diagrammatical view showing the electrical connections of the indicating device.

In order that the rotation of each airplane may be indicated, and also the direction of rotation indicated, the following device is used. Referring to Fig. 1 an insulated base 29 is mounted on the hanger 11 and carries three binding posts 30, 31 and 32. A trip lever 33, which acts as a contact arm, is pivoted at 31, extends forward, and projects outwardly and into the path of rotation of the rod 4 which supports the airplane 3. The binding post 30, Fig. 3, is connected to a contact point 34, and the binding post 32 is connected to a contact point 35. An electrical indicating means such as a red light 36 is in series with the contact 34 and binding post 31, and an indicating means, such as a white light, 37 is in series with contact 35 and binding post 31. A source of electrical energy, represented as a battery 38, furnishes electrical energy for operating the indicating means such as lights 36 and 37. It will therefore be seen that when the switch 33 is in its neutral position, as indicated by the solid lines, the indicating means will be inoperative but when the switch is moved to either position, as indicated by the dotted lines, either one or the other of the lights is operated, according to which side the switch is moved. The lever 33, Fig. 3, is of such a length that as the rod 4 strikes it and moves it about its pivot 31 the rod 4 is allowed to pass by at the extreme position of movement of lever 33, due to its foreshortening with respect to the plane of rotation of rod 4. This is clearly shown in Fig. 3 by the arc A—B representing the path of movement of the end of the lever 33 and the line C—D indicating the relative path of travel of the rod 4.

The other unit 2 of the device, and as many more as may be used, are constructed in the same way and operate in the same manner as the unit just described and the same numerals apply to similar parts except that the numerals relating to the second unit have had the suffix prime (′) added after them to more clearly differentiate them from the parts of the first unit.

*Operation.*

The principle of operation of this device is based on the compound pendulum motion, in cooperation with which, and as an operating means for which, an oscillatory motion is given to the point of suspension. If the point of suspension of a pendulum is oscillated in a direction opposite to the vibration of the pendulum, at that instant, the amplitude of the pendulum vibrations will be increased, provided this oscillatory motion is in proper synchronism with the vibrations of the pendulum.

If therefore the handle 27 (Fig. 1) is rocked back and forth an oscillatory motion will be produced on shaft 19 and will be transmitted through the rocking arm 18 and cables 16 to the rocking arm 14 which will in turn oscillate the shaft 10 and disc 9 carrying crank pin 7. This crank pin is the point of suspension of the airplane 3, rod 4 and bearing 5, which three latter members constitute the pendulum. As the crank pin moves to the right the airplane is moved to the right, but lagging somewhat behind; and as the crank pin moves back to the left the airplane, due to its momentum, continues to swing to the right about its point of suspension (crank pin 7). When, therefore, the airplane attains a momentary position of equilibrium the pin 7 is moving back and in advance of the pendulum; it therefore increases the speed of vibration of the pendulum and the swing or vibration of the airplane (amplitude) to the left will be slightly greater than its previous movement to the right.

By successively repeating the oscillation or vibration of the crank pin 7 in proper timed relation to the oscillations or vibrations of the airplane the amplitude of the oscillations of the airplane will be increased until the airplane will attain sufficient momentum to rotate about its pivot 7. This rotation may be either forward or backward, i. e. clockwise or anti-clockwise, according to the skill of the operator. The indicating means described above will show which way the airplane rotated, or looped. For instance if this rotation was forward (clockwise in Fig. 1) the white light would be lighted; while if the rotation was backward (anti-clockwise) the red light would be lighted.

With a plurality of contenders operating a plurality of units the first to loop his airplane forward (clockwise) would be the winner of the contest and any contender who caused his airplane to loop backward would be eliminated: all of which would be indicated by the lights or other indicating means.

After the device has been operated and the switch or switches 33 have been moved to either operative position the switch or switches may be moved back to neutral or inoperative position or positions. This may be done manually or by any other suitable means.

If the weight of each airplane used is not sufficient to hold its respective lever 22 in a neutral position springs such as 39 might be attached to the ends of the rocker arms 18, and be secured to the floor or other support.

It is to be understood, as already stated, that instead of airplanes any other objects might be used that appeal to the fancy, such for example as miniature automobiles, dirigibles, or various other objects, all of which will be obvious to those skilled in the art.

Having thus described my invention in detail in its present preferred embodiment, it will be obvious to those skilled in the art, after understanding my invention, that various changes and modifications may be made therein without departing from the spirit and scope thereof, and I aim in the appended claims to cover all such modifications and changes.

What I claim is:—

1. In an amusement device the combination of a pivot, a fanciful object supported from said pivot by a rigid link and free to rotate about said pivot, an oscillatable shaft, means for manually oscillating said shaft, and means for imparting said oscillations to said object whereby said object may be caused to loop.

2. An amusement device comprising a fanciful object, a member on which said object is supported for rotation thereabout in a substantially vertical plane, means for causing said rotation, and a lever in the path of a member movable with said rotatable object and engageable by said member when said object has completed substantially a half of one revolution for indicating said rotation.

3. In an amusement device the combination of a miniature airplane, an oscillatable shaft, means for manually oscillating said shaft, means for imparting said oscillations to said airplane whereby said airplane may be caused to loop, and means actuated by the looping of said airplane for indicating whether said airplane loops forward or backward.

4. An amusement device comprising a plurality of fanciful objects, and independent means associated respectively with each of said objects to cause said objects to oscillate in a substantially vertical plane whereby said objects may be made to rotate individually.

5. An amusement device comprising a plurality of oscillatable members, a plurality of fanciful objects in the form of simple pendulums attached each to one of said members and free to oscillate and rotate in a vertical plane thereabout respectively, and individual means to oscillate each of said members to cause said objects to rotate in a clockwise or anti-clockwise direction.

6. In an amusement device the combination of a fanciful object, an oscillatable shaft, a member adapted to oscillate with said shaft, a rotatable member carried by said oscillatable member and rigidly supporting said fanciful object, and means to oscillate said shaft to cause said object to rotate about said oscillatable member.

7. In an amusement device the combination of a fanciful object, an oscillatable shaft to which said object is attached and about which said object is free to rotate, a hanger supporting said shaft, means to oscillate said shaft, and means associated with said hanger to limit the oscillations of said shaft.

8. In an amusement device the combination of a fanciful object, an oscillatable member from which said object is suspended and about which said object is free to rotate in a substantially vertical plane in both directions, control means comprising a first portion carried by a movable member of said device and a second portion in the path of said first portion and carried by a fixed member of said device and adapted to be engaged thereby, indicating means operable by said control means to indicate the direction of rotation of said object.

9. In an amusement device the combination of a fanciful object, an oscillatable member from which said object is suspended and about which said object is free to rotate in a substantially vertical plane in both directions, a trip lever in the path of rotation defined by said object and operable by a member suspended from said oscillatable member, indicating means operable by said control means to indicate one direction of rotation of said object, and indicating means to indicate the other direction of rotation of said object.

10. In an amusement device the combination of a pendulum, and means for manually oscillating the point of suspension of said pendulum in a substantially vertical plane to increase the amplitude of said pendulum in a plane substantially parallel to the plane of oscillation of said point of suspension.

11. In an amusement device the combination of a pendulum mounted free to rotate about its point of suspension, and means for manually oscillating the point of suspension of said pendulum in a substantially vertical plane to increase the amplitude of said pendulum.

12. In an amusement device the combination of a pendulum adapted to oscillate in a substantially vertical plane, and an oscillatable lever having a limited throw on each side of its neutral position for oscillating the point of suspension of said pendulum in a substantially vertical plane to progressively increase the amplitude of said pendulum during successive vibrations.

13. In an amusement device the combination of an oscillatable shaft, a member carried by said shaft and adapted to oscillate therewith, a pivot carried by said member and adapted to oscillate about said shaft, an object suspended from said pivot and adapted to rotate thereabout in either direction, and means for imparting said oscillatory motion to said shaft whereby said object may be made to rotate about the axis of said pivot in either direction.

14. In an amusement device the combination of an oscillatable shaft, a member carried by said shaft and adapted to oscillate therewith, a pivot carried by said member and adapted to oscillate about said shaft, an object suspended from said pivot and adapted to rotate thereabout in either direction and to oscillate about said shaft, and means for imparting said oscillatory motion to said shaft whereby said object may be made to oscillate and to rotate about the axis of said pivot in either direction.

15. In an amusement device the combination of a pendulum restricted to oscillate in a vertical plane, and means for moving the point of suspension of said pendulum away from the point of equilibrium of said pendulum to increase the amplitude of said pendulum.

16. In an amusement device the combination of a pendulum, and means for successively moving the point of suspension of said pendulum away from the point of equilibrium of said pendulum to increase the amplitude of said pendulum thereby causing said pendulum to rotate about its point of suspension.

17. In an amusement device the combination of a pendulum, a suspension pivot for said pendulum, said pendulum being mounted on said pivot for rotation thereabout in a susbtantially vertical plane, means for imparting limited successive impulses to said pendulum directed in a substantially vertical plane, whereby said pendulum may be caused to loop in a substantially vertical plane.

In testimony whereof I have signed my name to this specification.

PAUL U. DANIEL.